(12) United States Patent
Sartin

(10) Patent No.: US 10,780,751 B2
(45) Date of Patent: Sep. 22, 2020

(54) HITCH PIN LOCK SYSTEMS

(71) Applicant: PAKMULE, LLC, Houston, TX (US)

(72) Inventor: Kansas Ryan Sartin, Houston, TX (US)

(73) Assignee: PAKMULE, LLC, Houston, TX (US)

( * ) Notice: Subject to any disclaimer, the term of this patent is extended or adjusted under 35 U.S.C. 154(b) by 134 days.

(21) Appl. No.: 15/809,154

(22) Filed: Nov. 10, 2017

(65) Prior Publication Data
US 2019/0143770 A1     May 16, 2019

(51) Int. Cl.
| | |
|---|---|
| B60D 1/28 | (2006.01) |
| B60D 1/58 | (2006.01) |
| B60D 1/60 | (2006.01) |
| F16B 33/02 | (2006.01) |
| B60D 1/02 | (2006.01) |

(52) U.S. Cl.
CPC .............. B60D 1/28 (2013.01); B60D 1/025 (2013.01); B60D 1/58 (2013.01); B60D 1/60 (2013.01); F16B 33/02 (2013.01); *Y10T 24/45225* (2015.01); *Y10T 24/45262* (2015.01)

(58) Field of Classification Search
CPC . B60D 1/145; B60D 1/28; B60D 1/52; B60D 1/58; B60D 1/583; B60D 1/60; F16B 33/02; Y10T 24/45225; Y10T 24/45241; Y10T 24/45262; Y10T 24/45602; Y10T 24/45623; Y10T 24/4566; Y10T 24/45723; Y10T 24/45728; Y10T 24/45733
See application file for complete search history.

(56) References Cited

U.S. PATENT DOCUMENTS

| | | | | |
|---|---|---|---|---|
| 4,473,914 A | * | 10/1984 | Haft | ........................ B21J 15/02 29/520 |
| 6,609,725 B1 | * | 8/2003 | Williams | ................. B60D 1/06 280/506 |

(Continued)

OTHER PUBLICATIONS

Softride Bike Racks Catalog, 10 pages, downloaded from the internet at https://images.carid.com/softride/items/pdf/softride-product-catalog.pdf on Apr. 16, 2020.

*Primary Examiner* — Jacob D Knutson
*Assistant Examiner* — Maurice L Williams
(74) *Attorney, Agent, or Firm* — Edmonds & Cmaidalka, P.C.

(57) ABSTRACT

A hitch system is described for coupling an object to a vehicle hitch. The hitch system can have a connector adapted to connect to a vehicle hitch having a connector channel that passes through the connector and has an internal threaded section; a lock rod having, a first section wherein at least a portion of the first section is threaded wherein the internal threaded section of the connector are adapted to receive the threads of the first section of the lock rod and a second section; and a locking member having a first locking member channel having an inside diameter and an outside diameter wherein the inside diameter of the locking member channel is smaller than the diameter of the second section and a lock to move between a locked position and an opened position wherein the second section of the lock rod is secured to the locking member when the second section is disposed within the locking member channel and the lock is in the locked position and is removable when the lock is in the opened position.

20 Claims, 4 Drawing Sheets

(56) References Cited

U.S. PATENT DOCUMENTS

| | | | |
|---|---|---|---|
| 6,773,200 B2* | 8/2004 | Cole | B60D 1/60 403/21 |
| 7,004,491 B1 | 2/2006 | Allsop et al. | |
| 7,066,483 B2* | 6/2006 | Makos | B60D 1/485 280/507 |
| 7,338,065 B1* | 3/2008 | Clausen | B60D 1/241 280/505 |
| 8,302,435 B2* | 11/2012 | Burmesch | B60D 1/02 70/14 |
| 9,242,521 B2* | 1/2016 | Columbia | B60D 1/52 |
| 9,616,722 B2* | 4/2017 | Williams | B60D 1/52 |
| 2002/0073746 A1* | 6/2002 | Wyers | B60D 1/52 70/34 |
| 2002/0108407 A1* | 8/2002 | Zapushek | B60D 1/60 70/34 |
| 2002/0145270 A1* | 10/2002 | Williams | B60B 9/04 280/506 |
| 2006/0017260 A1* | 1/2006 | Andersen | B21C 23/14 280/491.5 |
| 2007/0180871 A1* | 8/2007 | Irgens | E05B 67/36 70/34 |
| 2008/0252042 A1* | 10/2008 | Sparkes | B60D 1/00 280/491.3 |
| 2011/0036129 A1* | 2/2011 | Frantz | B60D 1/52 70/57 |
| 2018/0117979 A1* | 5/2018 | Columbia | B60D 1/52 |

\* cited by examiner

HITCH PIN LOCK SYSTEMS

BACKGROUND

Field

Embodiments described generally relate to hitch pin lock systems. More particularly, such embodiments relate to hitch basket and hitch trailer connectors and locks.

Description of the Related Art

Hitch pin locks are intended to secure objects such as a hitch basket or trailer to a vehicle. These locks are typically straight metal rods that are inserted into a cylindrical lock.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
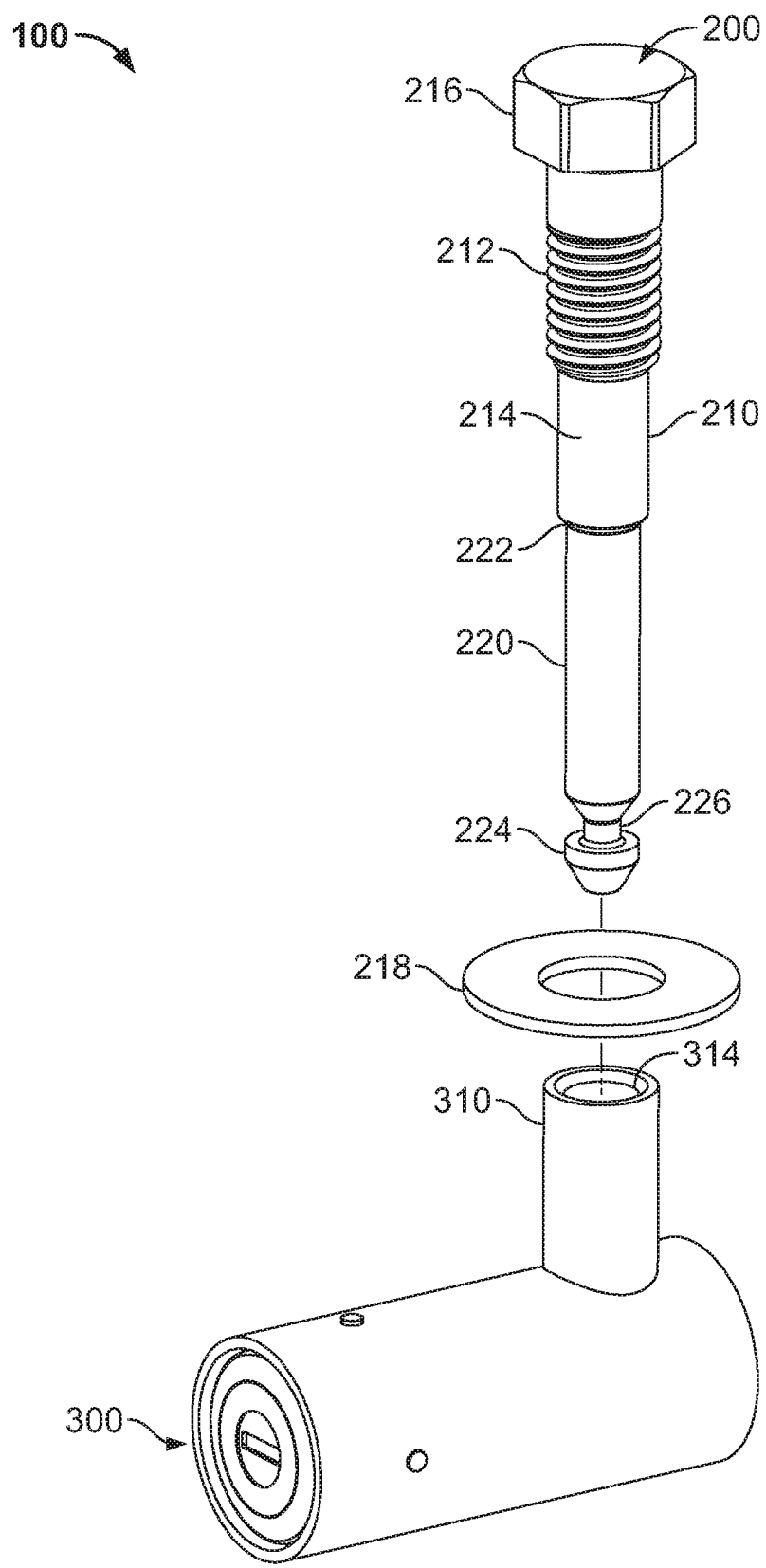
FIG. 1 depicts an expanded view of the hitch pin lock system, according to one or more embodiments described.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same may be equally effective at various angles or orientations.

FIG. 1 depicts an expanded view of an illustrative hitch pin lock 100, according to one or more embodiments. The hitch pin lock 100 can include a lock rod 200, and a locking member 300. The hitch pin lock 100 is generally designed to secure an object to a vehicle. The hitch pin lock 100 of the present invention is designed to reduce movement and wobbling of the hitch pin lock 100 when a vehicle is in motion.

The lock rod 200, locking member 300, connector 400, and hitch basket 600 can be fabricated from any number of materials. For example, suitable materials can include, but are not limited to, any one or more metals (such as aluminum, steel, stainless steel, brass, nickel), wood, other composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (FTFE), polyamide resins (such as nylon 6 (N6), nylon 66 (N66)), polyester resins (such as polybutylene terephthalate (PBT), polyethylene terephthalate (PET), polyethylene is phthalate (PEI), PET/PEI copolymer) polynitrile resins (such as polyacrylonitrile (PAN), polymethacrylonitrile, acrylonitrile-styrene copolymers (ASt), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PB), butyl rubber, neoprene rubber, halobutyl rubber and the like)), and mixtures, blends, or copolymers of any and all of the foregoing materials.

Figure 2:
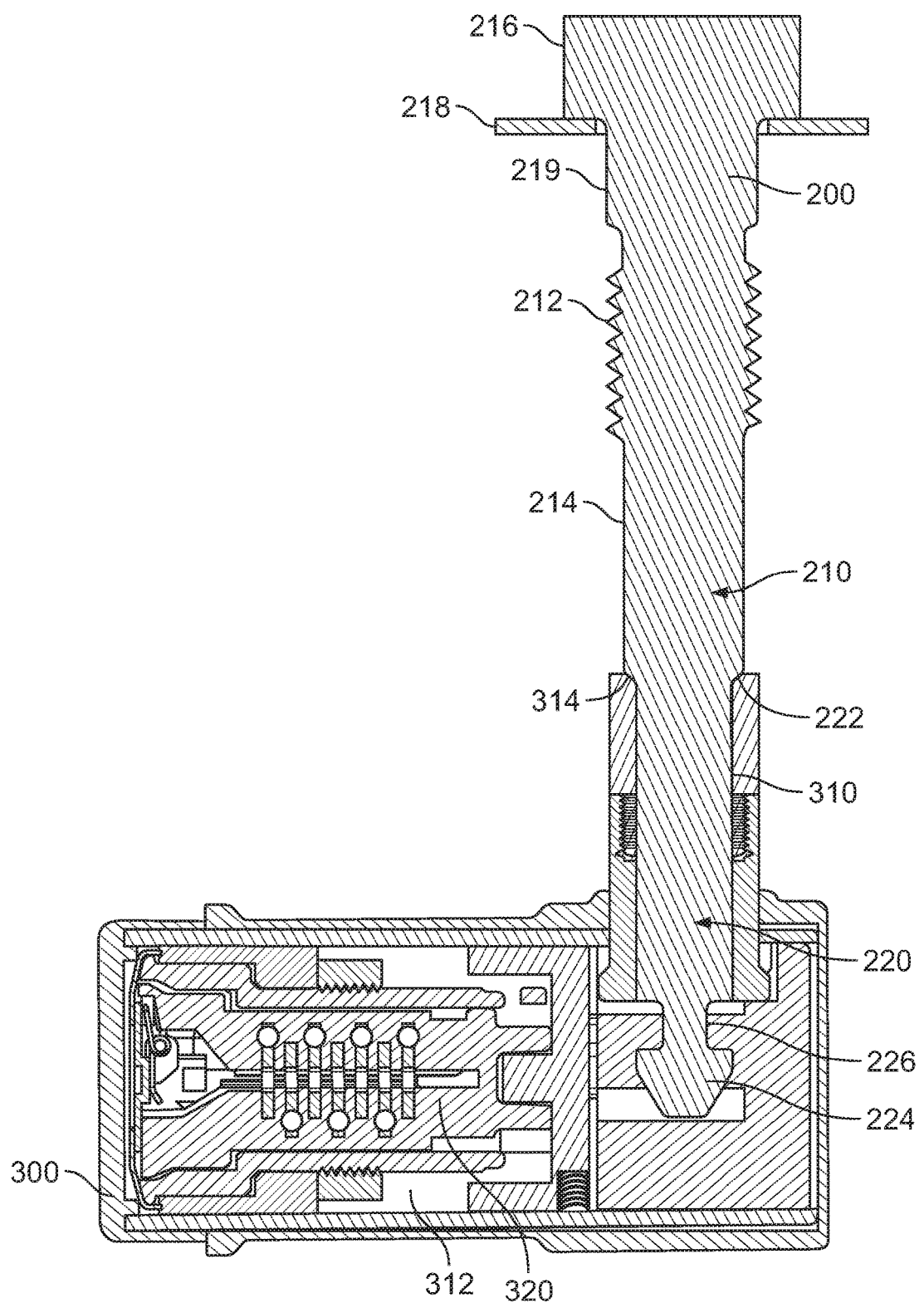
FIG. 2 depicts an illustrative cross-sectional view of the hitch pin lock system, according to one or more embodiments described.

FIG. 2 depicts an illustrative cross-sectional view of the lock system 100. The lock rod 200 can be composed of multiple sections each having different diameters to allow the lock rod 200 to more securely fit into the locking member collar or channel 310. The lock rod 200 can have a first section 210 that has a threaded section 212 and an unthreaded section 214. The threaded section 212 can be less than 60%, 50%, 40%, 30%, 20%, 10% of the total first section 210. The threaded section 212 can be at least 0.25 in, at least 0.27 in, at least 0.35 in, at least 0.5 in, or at least 1 in long. The threaded section 212 can be between 0 in and 2 in, between 0.27 in and 2 in, between 0.27 in and 1.5 in, between 0.27 in and 1 in, or between 0.5 and 1 in long. The lock rod 200 can have a bolt head 216. The bolt head 216 can consist of any type of bolt head size and shape known in the art (e.g., hex head, carriage bolt head, truss head, fillister head, etc.). A washer 218 can also be used with the lock rod 200. Any type of appropriate washers can be used such as flat, square, locking, dock, fender, etc. Additionally, there can be a smooth section 219 that runs from the bottom of the bolt head 216 to the threaded section 212. The smooth section 219 can be at least 0.25 in, at least, 0.5, at least 1 in long. The smooth section 219 can be between 0 in and 2 in, between 0 in and 1 in, between 0.25 in and 1.75 in, between 0.25 in and 1.5 in, between 0.25 in and 1 in. between 0.25 and 0.5 in long.

The first section 210 of the lock rod 200 can be at least 0.25 in, at least 0.27 in, at least 0.35 in, at least 0.5 in, at least 1 in, or at least 1.5 in long. The first section 210 can be between 0 in and 4 in, between 0.27 in and 4 in, between 0.27 in and 3 in, between 0.27 in and 2 in, between 0.27 in and 1.5 in, between 0.27 in and 1 in.

The second section 220 of the lock rod 200 can be at least 0.25 in, at least 0.27 in, at least 0.35 in, at least 0.5 in, at least 1 in, or at least 1.5 in long. The second section 220 can be between 0 in and 4 in, between 0.27 in and 4 in, between 0.27 in and 3 in, between 0.27 in and 2 in, between 0.27 in and 1.5 in, between 0.27 in and 1 in. Further, the second section 220 can be similar in length to the first section 210. The length of the second section 220 can be between 90%-110% of the length of the first section 210, between 80%-120% of the length of the first section 210, between 70%-130% of the first section 210, greater than 80% of the length of the first section 210, greater than 90% of the length of the first section 210, greater than 100% of the length of the first section 210.

The second section 220 can have a diameter that is smaller than the diameter of the first section 210. The second section 220 can be designed to slide into channel 310 where it can be securely attached to locking member 300. At least a portion of the inside diameter of channel 310 can be smaller than the outside diameter of the second section 220 of the lock rod 200 to prevent the lock rod 200 from penetrating too far into the channel 310. The inside diameter of channel 310 can also be larger than the outside diameter of the first section 210 of the lock rod 200. Additionally, the top of channel 310 can include a tapered portion 314 that is adapted to receive a tapered portion 222 located on the outer diameter of the lock rod 200 between the first section 210 and the second section 220. It is believed that this tapered portion 222 may help decrease the amount the lock system 100 wobbles when the system is attached to a moving vehicle.

The lock rod 200 can have a have a tapered end 224 to receive locking member 300. The lock rod 200 can further have a lock groove 226 to assist in securing the lock rod 200 to the locking member 300.

As also seen in FIG. 2, the locking member 300 can have one or more channels 310, 312. The second section 220 of the lock rod 200 can be entirely disposed within the locking member channel 310. Channels 310, 312 can be cylindrical, rectangular cuboid, triangular prism, square cuboid or any other shape. There can be 1, 2, or more channels 310, 312. Channel 310 can have a height outside the locking member 300 that is at least 0.5 in, at least 0.75 in, at least 1 in, at least 1.5 in or at least 2 in. Channel 310 can have a height outside the locking member 300 that is between 0 in and 3 in, between 0 in and 2.5 in, between 1 in and 3 in, between 1 in and 2.5 in or between 1.025 in and 2.275 in. Channel 312 can contain a lock 320. Lock 320 can move between a locked position and an opened or unlocked position, wherein the second section 220 of the lock rod 200 is secured to the locking member 300 when the second section 220 is disposed within the channel 310 and the lock 320 is in the locked position, and the lock rod 200 is removable from the locking member 300 when the lock 320 is in the opened or unlocked position.

A lock 320 of a known type can be used and which has an engaging member 330, which secures the tapered end 224 of the lock rod 200 by use of a key or other locking mechanism. In this regard, the engaging member 330 secures the tapered end 224 and the lock groove 226 of the lock rod 200 when in the locked position. When in the unlocked position, the lock rod 200 is removable from the locking member 300.

Figure 3:
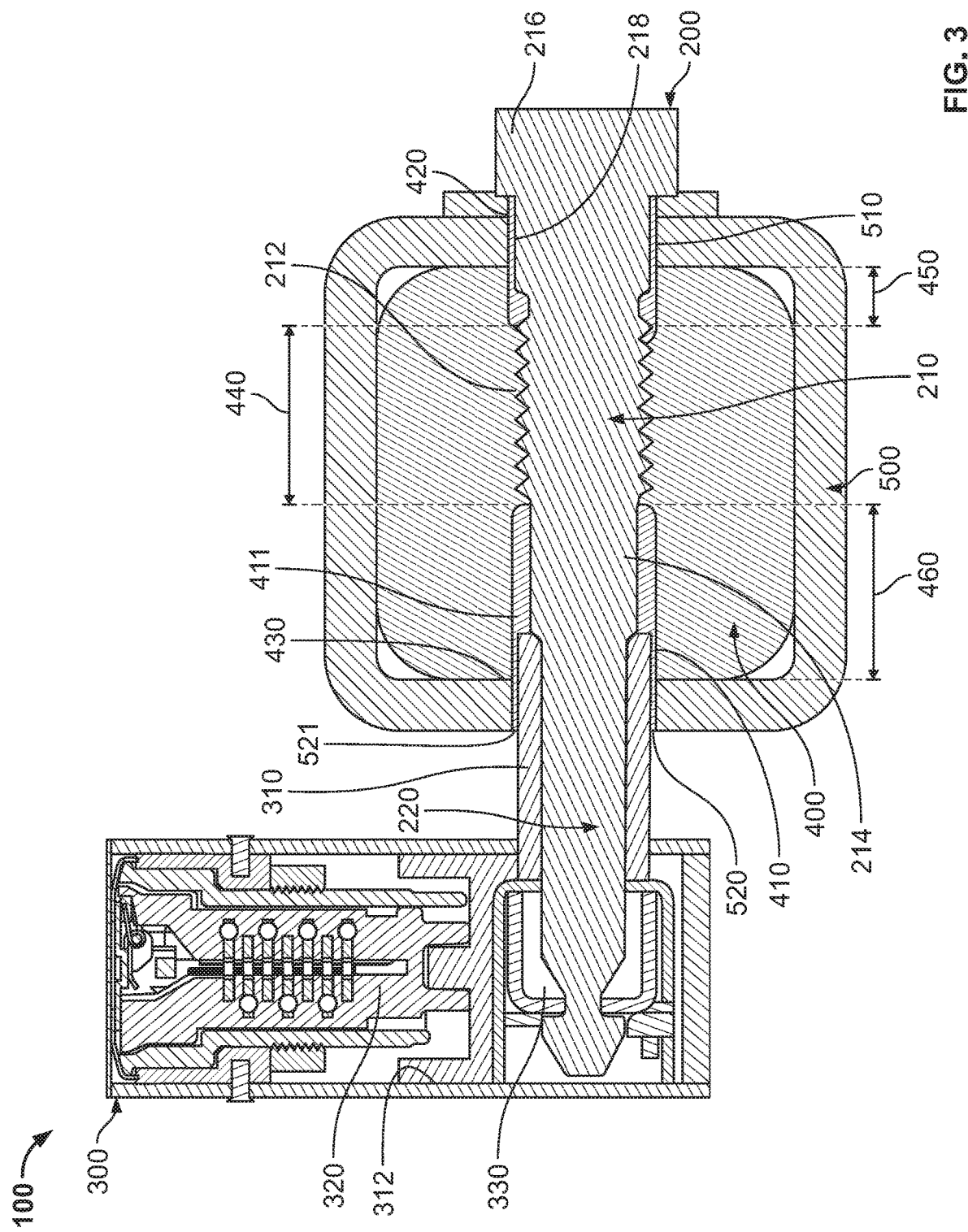
FIG. 3 depicts another illustrative cross-sectional view of the hitch pin lock system, according to one or more embodiments described.
Figure 4:
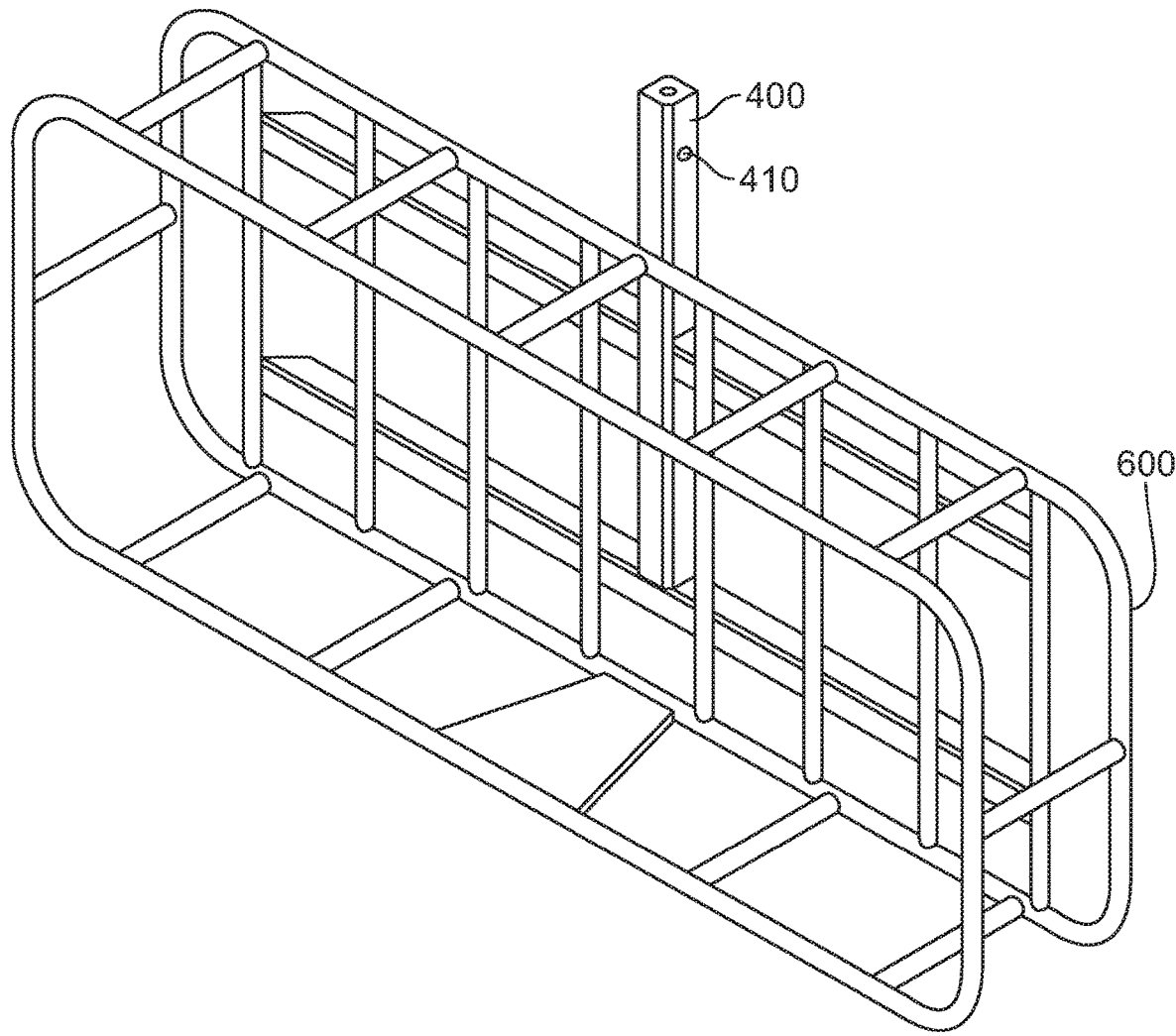
FIG. 4 depicts an isometric view of a connector within a hitch basket, according to one or more embodiments described.

As seen in FIG. 3, a connector 400 can be inserted into a vehicle hitch 500. As seen in FIG. 4, connector 400 can also be attached to a hitch basket 600. The connector 400 and hitch basket 600 can be made from a solid bar. The connector 400 and hitch basket 600 can be made from an aluminum solid bar. The connector 400 can have a channel 410 passing entirely through the connector 400, defining a first end opening 420 and a second end opening 430. The first end opening 420 and the second end opening 430 can be aligned with a first opening 510 and a second opening 520 formed through the vehicle hitch 500. Channel 410 can have an internal threaded section 440. In one embodiment, the internal threaded section 440 is not a nut welded to the connector. The internal threaded section 440 can be at least 0.25 in, at least 0.27 in, at least 0.35 in, at least 0.5 in, or at least 1 in long. The internal threaded section 440 can be between 0 in and 2 in, between 0.27 in and 2 in, between 0.27 in and 1.5 in, between 0.27 in and 1 in, or between 0.5 and 1 in long. Channel 410 can also have a first unthreaded section 450 between the first end 420 and the internal threaded section 440. The first unthreaded section 450 can be at least 0.25 in, at least 0.35 in, at least 0.5 in, or at least 1 in long. The first unthreaded section 450 can be between 0 in and 1.73 in, between 0.25 in and 1.73 in, between 0.25 in and 1.5 in, between 0.25 in and 1 in, or between 0.5 and 1 in long. Channel 410 can also have a second unthreaded section 460 between the second end 430 and the internal threaded section 440. The second unthreaded section 460 can be at least 0.25 in, at least 0.35 in, at least 0.5 in, or at least 1 in long. The second unthreaded section 460 can be between 0 in and 1.73 in, between 0.25 in and 1.73 in, between 0.25 in and 1.5 in, between 0.25 in and 1 in, or between 0.5 and 1 in long. Lock rod 200 can pass through channel 410 and can secure the connector 400 to the hitch 500.

The threaded section 212 of the lock rod 200 can be attached to the internal threaded section 440 wherein the threads in the inside the channel 410 can match with and threadedly engage threaded section 212 of the lock rod 200. The threaded section 212 of the lock rod 200 can be longer, shorter, or the same length as the internal threaded section 440. The vehicle hitch 500 also can have internal threads (not shown) that match with and threadedly engage the threaded section 212 of the lock rod 200. Vehicle hitch 500 would typically have a two (2) inch opening that receives connector 400; however, the present invention would work on vehicle hitches having larger or smaller openings. All of the threads described in this application can be right-handed or left-handed threads.

As shown in FIG. 3, the locking member channel 310 can be at least partially inserted into the connector channel 410 and the hitch 500 through the openings 430 and 520. The distance from the channel 410 to the wall of the vehicle hitch opening 520 can be less than 0.0625 in, less than 0.05 in, less than 0.03125 in, less than 0.025 in, or less than 0.0156 in. The distance from the channel 410 to the wall of the vehicle hitch opening 520 can be between 0.005 in and 0.0625 in, between 0.005 in and 0.5 in, between 0.005 in and 0.03125 in, between 0.005 in and 0.025 in, or between 0.005 in and 0.0156 in. The distance from the channel 410 to the wall of the connector channel opening 430 can be less than 0.0625 in, less than 0.05 in, less than 0.03125 in, less than 0.025 in, or less than 0.0156 in. The distance from the channel 410 to the wall of the connector channel opening 430 can be between 0.005 in and 0.0625 in, between 0.005 in and 0.05 in, between 0.005 in and 0.03125 in, between 0.005 in and 0.025 in, or between 0.005 in and 0.0156 in. The distance from the channel 410 to the wall of the second unthreaded section 460 can be less than 0.0625 in, less than 0.05 in, less than 0.03125 in, less than 0.025 in, or less than 0.0156 in. The distance from the channel 410 to the wall of the second unthreaded section 460 can be between 0.005 in and 0.0625 in, between 0.005 in and 0.05 in, between 0.005 in and 0.03125 in, between 0.005 in and 0.025 in, or between 0.005 in and 0.0156 in. When the locking member channel 310 is inserted into the connector channel 410 and the hitch 500 through the openings 430 and 520, the distance from the end of the locking member channel 411 to the end of the vehicle hitch opening 521 can be at least 0.1 in, at least 0.2 in, at least 0.3 in, at least 0.4 in, at least 0.5 in, at least 0.6 in, at least 0.7 in, at least 0.8 in, at least 0.9 in, at least 1.0 in, at least 1.5 in. When the locking member channel 310 is inserted into the connector channel 410 and the hitch 500 through the openings 430 and 520, the distance from the end of the locking member channel 411 to the end of the vehicle hitch opening 521 can be between 0.1 in and 1 in, 0.2 in and 1 in, 0.3 in and 1 in, 0.4 in and 1 in, 0.5 in and 1 in, between 0.1 in and 1.5 in, 0.25 in and 1.5 in, 0.5 in and 1.5 in, 0.75 in and 1.5 in, 1.0 and 1.5 in, between 0.2 in and 2 in, 0.5 in and 2 in, 0.75 in and 2 in, 1.0 in and 2 in, 1.5 and 2 in.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A hitch system, comprising;
a connector having a connector channel that passes through the connector, wherein the connector channel has a threaded section formed directly on an inner surface of the connector channel and an adjoining non-threaded section;
a lock rod comprising a first section and a second section, wherein at least a portion of the first section is threaded and wherein the threaded section of the connector channel is adapted to engage the threads of the first section of the lock rod and wherein the lock rod further comprises a tapered section located between the first section and the second section; and
a locking member having a locking member channel disposed therein, the locking member channel having an inside diameter, an outside diameter, and a tapered end portion, wherein the locking member is configured to receive the second section of the lock rod and the tapered end portion is configured to engage the tapered section of the lock rod; and
a lock configured to move between a locked position and an opened position, wherein the second section of the lock rod is secured to the locking member when the second section of the lock rod is disposed within the locking member channel and the lock is in the locked position.

2. The hitch system of claim 1 wherein the threaded section of the connector is between 0.27 inches and 1.5 inches in length.

3. The hitch system of claim 1 wherein the non-threaded section is located between a first end of the connector channel and the threaded section.

4. The hitch system of claim 3 wherein the first unthreaded section is between 0.25 inches and 1.5 inches in length.

5. The hitch system of claim 3 wherein the connector has a second non-threaded section located between a second end of the connector channel and the threaded section.

6. The hitch system of claim 5 wherein the second unthreaded section is between 0.25 inches and 1.5 inches in length.

7. The hitch system of claim 1 wherein the connector is made from a solid bar material.

8. The hitch system of claim 1 wherein the connector is made from an aluminum solid bar material.

9. The hitch system of claim 1 wherein when the lock rod is threaded into the connector and secured to the locking member, the locking member channel is inserted into the connector channel.

10. A hitch pin lock, comprising;
a lock rod comprising a first section wherein at least a portion of the first section is threaded and a second section having an outer diameter that is smaller than an outer diameter of the first section, wherein the first section and the second section are joined by a tapered section; and
a locking member having a first locking member channel with a tapered end portion, the tapered end portion of the first locking member is configured to engage the tapered section of the lock rod when the second section of the lock rod is disposed within the first locking member channel; and a lock configured to move between a locked position and an opened position, wherein the second section of the lock rod is secured to the locking member when the second section of the lock rod is disposed within the first locking member channel and the lock is in the locked position and is removable from the locking member when the lock is in the opened position.

11. The hitch pin lock of claim 10 wherein the first locking member channel has an inside diameter that is larger than the outer diameter of the second section of the lock rod and is configured to receive the second section of the lock rod.

12. The hitch pin lock of claim 11 wherein the inside diameter of the first locking member channel is smaller than the outer diameter of the first section of the lock rod.

13. The hitch pin lock of claim 10 wherein the lock rod has a hex bolt head.

14. The hitch pin lock of claim 10 wherein the locking member further comprises a second locking member channel that is perpendicular to the first locking member channel.

15. A hitch system, comprising;
a connector having a connector channel at least partially disposed therein, wherein an inner surface of the connector channel comprises at least one non-threaded section adjoining a threaded section formed directly on the inner surface of the connector channel that is between 0.27 inches and 1.5 inches in length and located between a first unthreaded section and a second unthreaded section within the connector channel, wherein each of the first unthreaded section and the second unthreaded section is between 0.25 inches and 1.5 inches in length;
a lock rod comprising a first section and a second section having an outer diameter smaller than an outer diameter of the first section, wherein at least a portion of the first section is threaded and wherein the threaded section of the connector channel is adapted to engage the threads of the first section of the lock rod and wherein the lock rod further comprises a tapered section located between the first section and the second section; and
a locking member having a locking member channel disposed therein, the locking member channel having an inside diameter, an outside diameter, and a tapered end portion, wherein the inside diameter of the locking member channel is larger than the outside diameter of the second section of the lock rod and is configured to receive the second section of the lock rod and the tapered end portion is configured to engage the tapered section of the lock rod; and
a lock configured to move between a locked position and an opened position wherein the second section of the lock rod is secured to the locking member when the second section of the lock rod is disposed within the locking member channel and the lock is in the locked position and is removable from the locking member when the lock is in the opened position,
wherein the locking member channel is at least partially disposed within the connector channel when the threads on the first section of the lock rod engage the threaded section within the connector channel and the second section of the lock rod is secured to the locking member.

16. The hitch system of claim 15 further comprising a hitch basket and wherein the connector is disposed within at least a portion of the hitch basket.

17. The hitch system of claim 16 wherein the hitch basket is fabricated from an aluminum solid bar material.

18. A hitch system, comprising;
a connector having a connector channel that at least partially passes through the connector, wherein the connector channel is only partially threaded;
a lock rod comprising a first section that is at least partially threaded, a second section having a smooth outside diameter that is smaller than an outside diameter of the first section, and a tapered section disposed between and joining the first section and the second section, wherein the threads within the connector channel are adapted to engage the threads of the first section of the lock rod;
a locking member having a locking member channel disposed therein and a tapered end portion configured to engage the tapered section of the lock rod, wherein the locking member channel is configured to receive the second section of the lock rod; and
a lock configured to secure the second section of the lock rod within the locking member channel.

19. The hitch system of claim 18 wherein the connector is made from an aluminum solid bar material.

20. The hitch system of claim 18 wherein at least a portion of the locking member is located within the non-threaded section of the connector channel when the threads within the connector channel engage the threads of the first section of the lock rod.

* * * * *